(12) United States Patent
Horii et al.

(10) Patent No.: US 10,404,139 B2
(45) Date of Patent: Sep. 3, 2019

(54) ROTARY ELECTRIC MACHINE

(71) Applicant: Mitsubishi Electric Corporation, Tokyo (JP)

(72) Inventors: Masaki Horii, Tokyo (JP); Hiroyuki Higashino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 386 days.

(21) Appl. No.: 15/304,592

(22) PCT Filed: May 27, 2014

(86) PCT No.: PCT/JP2014/063975
§ 371 (c)(1),
(2) Date: Oct. 17, 2016

(87) PCT Pub. No.: WO2015/181889
PCT Pub. Date: Dec. 3, 2015

(65) Prior Publication Data
US 2017/0047822 A1 Feb. 16, 2017

(51) Int. Cl.
*H02K 1/12* (2006.01)
*H02K 3/24* (2006.01)
(Continued)

(52) U.S. Cl.
CPC ............. *H02K 9/19* (2013.01); *H02K 1/12* (2013.01); *H02K 3/24* (2013.01); *H02K 5/20* (2013.01)

(58) Field of Classification Search
CPC .. H02K 9/19; H02K 1/12; H02K 3/24; H02K 5/20
(Continued)

(56) References Cited

U.S. PATENT DOCUMENTS 5,798,587 A * 8/1998 Lee .................... H02K 9/00
310/52
5,809,632 A * 9/1998 Champagne ........... H02K 3/24
29/402.03
(Continued)

FOREIGN PATENT DOCUMENTS

JP 2001-145302 A 5/2001
JP 2003-009454 A 1/2003
(Continued)

OTHER PUBLICATIONS

Communication dated Dec. 5, 2017 from the Japanese Patent Office in counterpart application No. 2016-523009.
(Continued)

*Primary Examiner* — Forrest M Phillips
(74) *Attorney, Agent, or Firm* — Sughrue Mion, PLLC; Richard C. Turner (57) ABSTRACT

A rotary electric machine includes: an annular cooling oil channel that is configured inside an externally mounted frame so as to face axially toward coils that are arranged in an annular shape and such that a surface that faces the coils is made into an opening; an oil pump; a nozzle that sprays cooling oil that is conveyed under pressure from the oil pump into the cooling oil channel from above; and a plurality of oil flow direction changing projections that are respectively disposed inside the cooling oil channel and are arranged circumferentially so as to face gaps between the coils and such that cooling oil receiving surfaces face upstream in a direction of flow of the cooling oil so as to change the cooling oil that flows through the cooling oil channel to an axial flow so as to be supplied to the gaps between the coils.

10 Claims, 8 Drawing Sheets

(51) Int. Cl.
*H02K 5/20* (2006.01)
*H02K 9/19* (2006.01)

(58) Field of Classification Search
USPC .......................................................... 310/54
See application file for complete search history.

(56) References Cited

U.S. PATENT DOCUMENTS

| | | | | |
|---|---|---|---|---|
| 6,515,384 | B1* | 2/2003 | Kikuchi | H02K 1/20 |
| | | | | 310/54 |
| 2002/0195885 | A1* | 12/2002 | Tsuneyoshi | H02K 1/185 |
| | | | | 310/43 |
| 2012/0025638 | A1* | 2/2012 | Palafox | H02K 3/24 |
| | | | | 310/52 |
| 2016/0141921 | A1* | 5/2016 | Kubes | H02K 5/20 |
| | | | | 310/54 |
| 2016/0164378 | A1* | 6/2016 | Gauthier | H02K 1/32 |
| | | | | 310/54 |
| 2016/0380504 | A1* | 12/2016 | Imura | H02K 5/18 |
| | | | | 310/54 |

FOREIGN PATENT DOCUMENTS

| | | |
|---|---|---|
| JP | 3385373 B2 | 3/2003 |
| JP | 2004180376 A | 6/2004 |
| JP | 2004-238952 A | 8/2004 |
| JP | 2006-33924 A | 2/2006 |
| JP | 2012-170299 A | 9/2012 |
| JP | 2013-207930 A | 10/2013 |
| JP | 5347380 B2 | 11/2013 |
| JP | 2014-042414 A | 3/2014 |

OTHER PUBLICATIONS

Notification of Reasons for Refusal dated Aug. 29, 2017 from the Japanese Patent Office in counterpart application No. 2016-523009.
Communication dated Nov. 14, 2017, from European Patent Office in counterpart application No. 14893469.8.
International Search Report of PCT/JP2014/063975 dated Aug. 19, 2014.

* cited by examiner

ROTARY ELECTRIC MACHINE

CROSS REFERENCE TO RELATED APPLICATIONS

This application is a National Stage of International Application No. PCT/JP2014/063975 filed May 27, 2014, the contents of which are incorporated herein by reference in its entirety.

TECHNICAL FIELD

The present invention relates to a rotary electric machine such as an electric motor or a generator that is mounted to a hybrid automobile or an electric automobile, for example, and particularly relates to an oil cooling construction for a stator coil.

BACKGROUND ART

In conventional rotary electric machines such as that described in Patent Literature 1, first and second coil ends are formed circumferentially at two axial end portions of a stator core, first and second cooling oil spraying portions are disposed on an upper portion of each of the first and second coil ends, and cooling oil is sprayed from the first and second cooling oil spraying portions and is supplied to the upper portion of each of the first and second coil ends.

In conventional rotary electric machines such as that described in Patent Literature 2, stator core segments are disposed annularly in a circumferential direction, coils are wound onto each of the stator core segments so as to be arranged annularly, circumferential oil channels are formed on an inner side surface of a housing so as to face the coils that are arranged annularly, openings of the circumferential oil channels are covered by annular oil channel covers, a plurality of nozzles are formed on the oil channel covers so as to face between the stator core segments or between the coils, cooling oil that is supplied to the circumferential oil channels is sprayed from the nozzles, and is supplied to the coils from axial directions.

CITATION LIST

Patent Literature

Patent Literature 1: Japanese Patent No. 3385373 (Gazette)
Patent Literature 2: Japanese Patent No. 5347380 (Gazette)

SUMMARY OF THE INVENTION

Problem to be Solved by the Invention

In the rotary electric machines that is described in Patent Literature 1, because the cooling oil spraying portions are disposed on the vertically upper portions of the coil ends, the cooling oil is not supplied to portions that are positioned in a vicinity of vertically lower portions of the coil ends, and the temperature of the portions that are positioned in the vicinity of the vertically lower portions of the coil ends increases. Because temperature control of the rotary electric machine is performed on maximum temperatures in the coils, one problem has been that thermal rating of the rotary electric machine cannot be improved, increasing the size of the rotary electric machine.

In the rotary electric machine that is described in Patent Literature 2, because the openings of the circumferential oil channels are covered by the oil channel covers, pressure loss in the oil channels is increased, requiring increased pumping power. Because the nozzles are also separated from the coils, large pumping power is required in order to provide sufficient spraying pressure. Thus, one problem has been that the oil pump that supplies the cooling oil is increased in size, increasing the size of the rotary electric machine.

The present invention aims to solve the above problems and an object of the present invention is to provide a rotary electric machine that reduces pressure loss and minimizes pumping power by making a surface of a cooling oil channel that faces a coil into an opening, and that also suppresses temperature increases in the coil and enables reductions in size to be achieved by changing cooling oil that flows through the cooling oil channel into an axial flow so as to be supplied between the coils using oil flow direction changing projections.

Means for Solving the Problem

A rotary electric machine according to the present invention includes: an externally mounted frame; a rotor that is rotatably disposed inside the externally mounted frame such that an axial direction of a shaft is horizontal; a stator including: an annular stator core that is disposed coaxially so as to surround the rotor and that is held by the externally mounted frame; and a plurality of coils that are mounted to the stator core so as to be arranged in an annular shape; an annular cooling oil channel that is configured inside the externally mounted frame so as to face axially toward the plurality of coils that are arranged in the annular shape and such that a surface that faces the plurality of coils is made into an opening; an oil pump; a nozzle that sprays cooling oil that is conveyed under pressure from the oil pump into the cooling oil channel from above; and a plurality of oil flow direction changing projections that are respectively disposed inside the cooling oil channel and are arranged circumferentially so as to face gaps between coils among the plurality of coils and such that cooling oil receiving surfaces face upstream in a direction of flow of the cooling oil so as to change the cooling oil that flows through the cooling oil channel to an axial flow so as to be supplied to the gaps between the coils.

Effects of the Invention

In the present invention, because the surface of the cooling oil channel that faces the coils is made into an opening, pressure loss in the cooling oil channel is reduced, enabling the required pumping power to be reduced. A compact oil pump can thereby be used, enabling the rotary electric machine to be reduced in size.

Because the oil flow direction changing projections are arranged circumferentially, the cooling oil is supplied approximately uniformly to the plurality of coils that are arranged in an annular shape. Because the coil temperature is thereby made uniform, and the thermal rating of the rotary electric machine is improved, the rotary electric machine can be reduced in size. In addition, because the cooling oil is supplied intensively to gaps between the coils, which become hottest, the coils can be cooled effectively.

DESCRIPTION OF EMBODIMENTS

Preferred embodiments of a rotary electric machine according to the present invention will now be explained with reference to the drawings.

Embodiment 1

Figure 1:
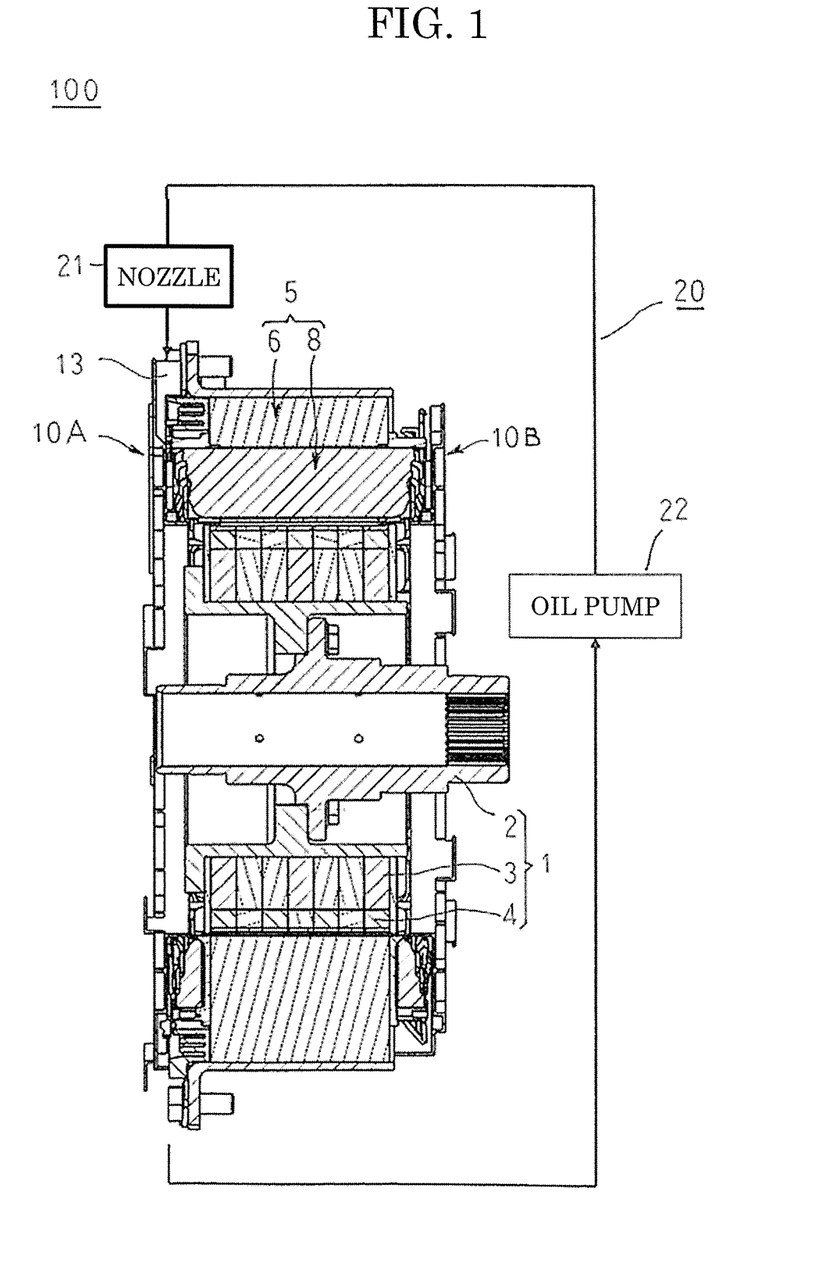
FIG. 1 is a cross section that shows a rotary electric machine according to Embodiment 1 of the present invention.
Figure 2:
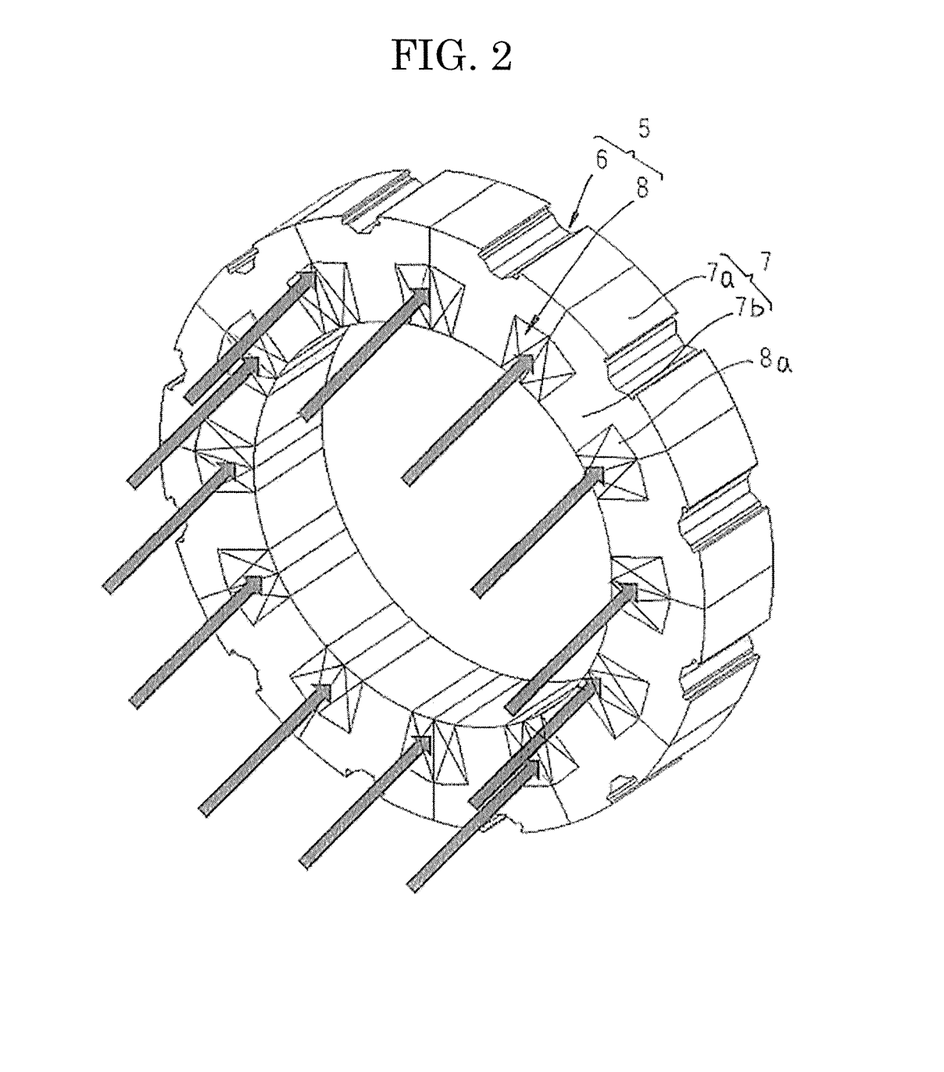
FIG. 2 is an oblique projection that shows a stator in the rotary electric machine according to Embodiment 1 of the present invention.
Figure 3:
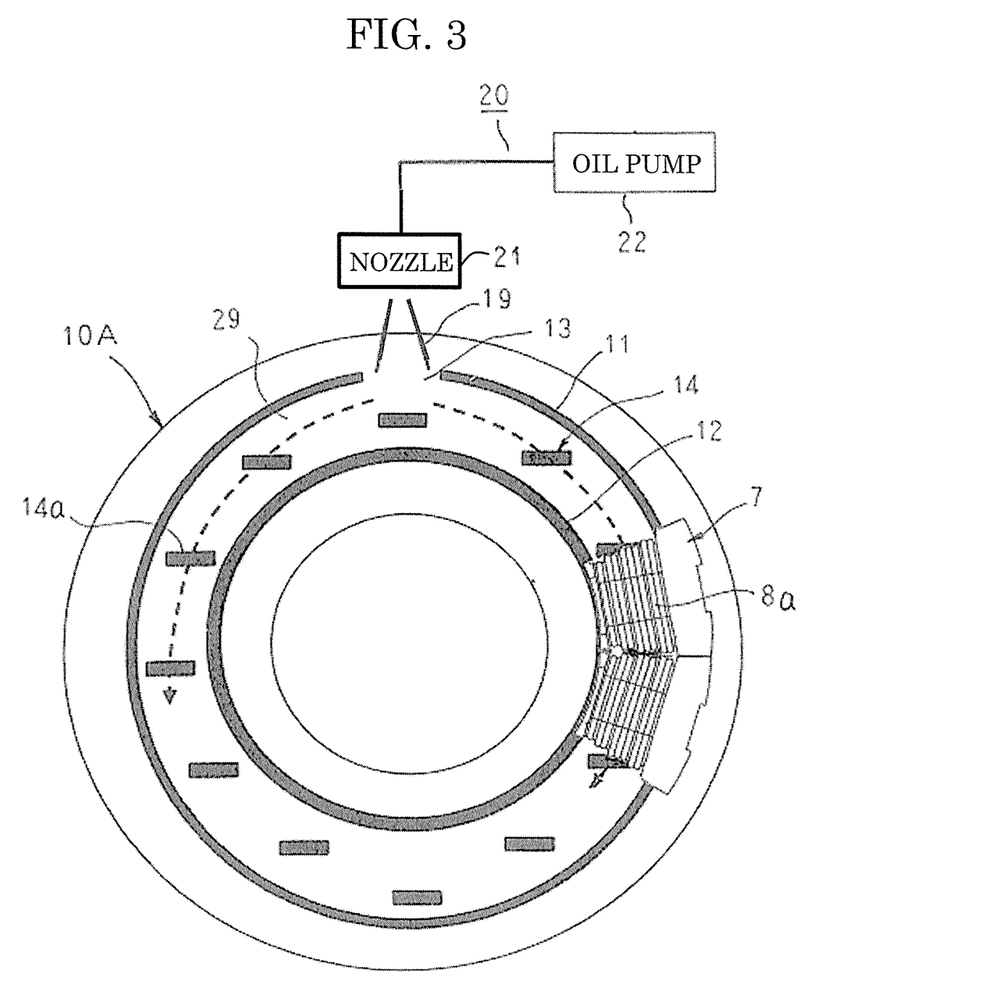
FIG. 3 is a front elevation that shows a first externally mounted frame in the rotary electric machine according to Embodiment 1 of the present invention.
Figure 4:
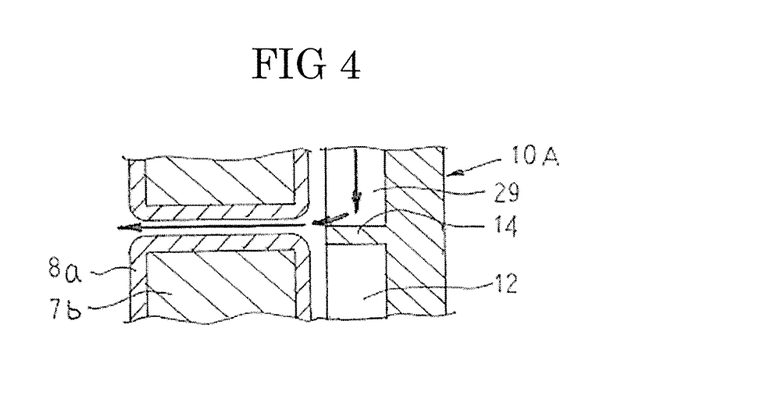
FIG. 4 is a schematic cross section that explains cooling oil flow in stator coils of the rotary electric machine according to Embodiment 1 of the present invention.

FIG. 1 is a cross section that shows a rotary electric machine according to Embodiment 1 of the present invention, FIG. 2 is an oblique projection that shows a stator in the rotary electric machine according to Embodiment 1 of the present invention, FIG. 3 is a front elevation that shows a first externally mounted frame in the rotary electric machine according to Embodiment 1 of the present invention, and FIG. 4 is a schematic cross section that explains cooling oil flow in stator coils of the rotary electric machine according to Embodiment 1 of the present invention. Moreover, arrows in FIGS. 1 through 4 represent cooling oil flow.

In FIG. 1, a rotary electric machine 100 that includes: a rotor 1 that is rotatably disposed inside first and second externally mounted frames 10A and 10B; a stator 5 that is held by the first and second externally mounted frames 10A and 10B so as to surround the rotor 1 so as to have a constant air gap interposed between the stator 5 and the rotor 1; and a cooling mechanism 20 that cools the stator 5.

The rotor 1 includes: a shaft 2; a rotor core 3 that is fixed to the shaft 2; and permanent magnets 4 that are mounted to the rotor core 3 to constitute magnetic poles, the rotor 1 being rotatably disposed inside the stator 5.

As shown in FIG. 2, the stator 5 includes: an annular stator core 6; and a stator coil 8 that is mounted to the stator core 6. Core segments 7 include: a circular arc-shaped back yoke portion 7a; and a tooth 7b that protrudes radially inward from a circumferentially central portion of an inner circumferential surface of the back yoke portion 7a. The stator core 6 is configured by arranging twelve core segments 7 into an annular shape such that circumferential side surfaces of the back yoke portions 7a are butted against each other. The stator coil 8 is constituted by twelve coils 8a that are each produced by winding a conductor wire for a plurality of turns onto the teeth 7b of the core segments 7. The twelve coils 8a constitute a U-phase coil, a V-phase coil, a W-phase coil, a U-phase coil, a V-phase coil, a W-phase coil, etc., in order circumferentially, for example, such that the stator coil 8 forms a three-phase alternating-current winding.

The first externally mounted frame 10A is produced so as to have a cup shape that covers a first axial end of the stator 5. As shown in FIG. 3, a radially outer peripheral wall portion 11 and an inner circumferential peripheral wall portion 12 are respectively formed concentrically on an inside wall surface of the first externally mounted frame 10A so as to protrude in an axial direction in annular shapes, to constitute an annular cooling oil channel 29. A vertically upper portion position of the radially outer peripheral wall portion 11 is cut away to constitute an oil inflow aperture 13. Twelve oil flow direction changing projections 14 are respectively formed on a circumference of a common circle on an inside wall surface of the first externally mounted frame 10A so as to protrude in an axial direction such that cooling oil receiving surfaces 14a are oriented upward. The cooling oil receiving surfaces 14a are formed so as to have flat surfaces that are perpendicular to a vertical direction. The twelve oil flow direction changing projections 14 are respectively formed inside the cooling oil channel 29 so as to face gaps between the circumferentially adjacent coils 8a in an axial direction. Amounts of axial protrusion of the radially outer peripheral wall portion 11, the inner circumferential peripheral wall portion 12, and the oil flow direction changing projections 14 are equal.

The second externally mounted frame 10B is produced so as to have a cup shape that covers a second axial end of the stator 5. A cooling oil channel is not formed on an inside wall surface of the second externally mounted frame 10B.

The cooling mechanism 20 includes: a nozzle 21 that is positioned vertically above the oil inflow aperture 13, and that sprays cooling oil 19 so as to be supplied into the cooling oil channel 29 through the oil inflow aperture 13; and an oil pump 22 that draws cooling oil 19 that has accumulated in lower portion spaces inside the first and second externally mounted frames 10A and 10B, and conveys it under pressure to the nozzle 21.

In the rotary electric machine 100 that is configured in this manner, cooling oil 19 is conveyed under pressure to the nozzle 21 by the oil pump 22 and is sprayed from the nozzle 21. The cooling oil 19 that is sprayed from the nozzle 21 is supplied to the cooling oil channel 29 from the oil inflow aperture 13, flows downward through the cooling oil channel 29, as indicated by arrows in FIG. 3. The cooling oil 19 that has flowed downward through the cooling oil channel 29 is changed into axial flow by contacting the cooling oil receiving surfaces 14a of the oil flow direction changing projections 14. As indicated by the arrows in FIGS. 2 and 4, the cooling oil 19 that has been changed to an axial flow is discharged from the cooling oil channel 29, specifically so as to be directed at the gaps between circumferentially adjacent coils 8*a* from a first axial end. Thus, as indicated by the arrows in FIG. 4, portions of the cooling oil 19 flow through the gaps between the coils 8*a* to a second axial end. The cooling oil that has flowed out at the second axial end of the coils 8*a* flows downward along the coils 8*a*. A remaining portion of the cooling oil 19 contacts surfaces of the coils 8*a*, and flows downward along the coils 8*a*.

According to Embodiment 1, an annular cooling oil channel 29 that is formed on an inside wall surface of a first externally mounted frame 10A is an open flow channel that has an opening on a side that faces the stator coil 8. Thus, pressure loss in the cooling oil channel 29 is reduced, reducing the load on the oil pump 22. Because the cooling oil 19 flows through the cooling oil channel 29 due to deadweight and pressure that results from deadweight, the load that acts on the oil pump 22 is reduced. Mechanical power of the oil pump 22 can thereby be reduced, making reductions in the size of the oil pump 22 possible, and enabling downsizing of the rotary electric machine 100 to be achieved.

Because oil flow direction changing projections 14 are disposed inside the cooling oil channel 29 so as to face the gaps between the circumferentially adjacent coils 8*a*, the cooling oil 19 flows through the gaps between the adjacent coils 8*a* from the first axial end to the second axial end. Contact area between the cooling oil 19 and the coils 8*a* is increased thereby, enabling the gaps between the coils 8*a*, which become hottest, to be cooled effectively.

Because the oil flow direction changing projections 14 are disposed inside the cooling oil channel 29 so as to face the gaps between the circumferentially adjacent coils 8*a*, the coils 8*a* that constitute the stator coil 8 are cooled uniformly. Temperatures are thereby prevented from rising in portions of the coils 8*a* and making the thermal rating of the rotary electric machine 100 impossible to improve, enabling downsizing of the rotary electric machine 100 to be achieved.

Because the coils 8*a* are concentrated winding coils, the coil ends are reduced, enabling the rotary electric machine 100 to be reduced in size. In addition, copper loss is reduced in the concentrated winding coils 8*a*, reducing the amount of heat generated. Thus, by adopting the present cooling construction, temperature increases in the coils 8*a* can be reliably suppressed.

Moreover, in Embodiment 1 above, the oil flow direction changing projections are formed such that cooling oil receiving surfaces that are constituted by flat surfaces are horizontal, but oil flow direction changing projections may be formed into inclined surfaces in which cooling oil receiving surfaces that are constituted by flat surfaces become gradually lower toward the coils. In that case, because cooling oil is supplied between the coils such that flow velocity thereof is hastened by colliding with the cooling oil receiving surfaces, the coils can be cooled more efficiently.

In Embodiment 1 above, oil flow direction changing projections are disposed such that the cooling oil receiving surfaces thereof, which are constituted by flat surfaces, face gaps between circumferentially adjacent coils, but in consideration of the influence of gravitational force, it is desirable for oil flow direction changing projections to be disposed such that cooling oil receiving surfaces that are constituted by flat surfaces are positioned slightly vertically above the gaps between the circumferentially adjacent coils, rather than level therewith.

Embodiment 2

Figure 5:
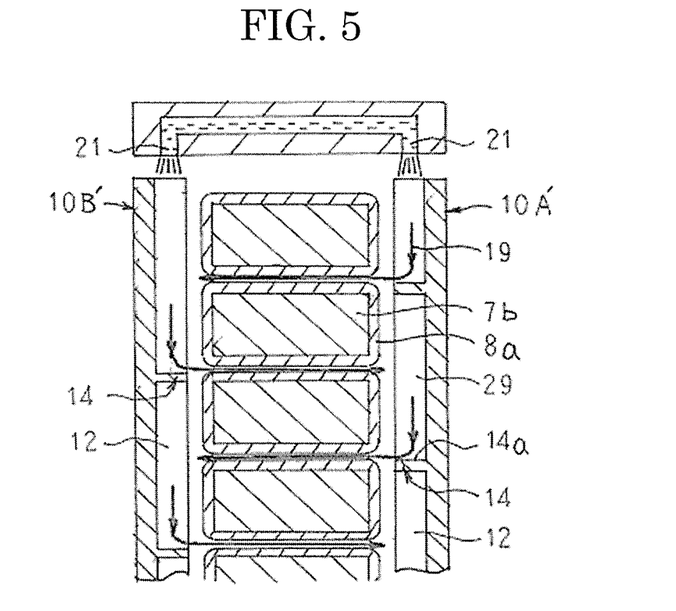
FIG. 5 is a schematic cross section that explains cooling oil flow in stator coils of a rotary electric machine according to Embodiment 2 of the present invention.

FIG. 5 is a schematic cross section that explains cooling oil flow in stator coils of a rotary electric machine according to Embodiment 2 of the present invention.

In FIG. 5, a radially outer peripheral wall portion (not shown) and an inner circumferential peripheral wall portion 12 are respectively formed concentrically on an inside wall surface of first and second externally mounted frames 10A' and 10B' so as to protrude in an axial direction in annular shapes, to constitute an annular cooling oil channel 29. A vertically upper portion position of the radially outer peripheral wall portion is cut away to constitute an oil inflow aperture. Six oil flow direction changing projections 14 are respectively formed on circumferences of each of two common circles on inside wall surfaces of the first and second externally mounted frames 10A' and 10B' so as to protrude in axial directions such that cooling oil receiving surfaces 14*a* are oriented upward. The oil flow direction changing projections 14 are formed on the inner circumferential wall surfaces of the first and second externally mounted frames 10A' and 10B' such that circumferential positions thereof alternate with each other. The oil flow direction changing projections 14 are thereby disposed so as to face gaps between circumferentially adjacent coils 8*a* so as to alternate between first and second axial ends.

Moreover, Embodiment 2 is configured in a similar or identical manner to Embodiment 1 except that the first and second externally mounted frames 10A' and 10B' are used instead of the first and second externally mounted frames 10A and 10B.

In Embodiment 2, cooling oil 19 that is supplied into the cooling oil channel 29 of the first externally mounted frame 10A' from the nozzle 21 flows downward through the cooling oil channel 29, is changed to axial flow at each of the oil flow direction changing projections 14, and the cooling oil 19 is sprayed into the gaps between the coils 8*a* from the first axial end. The cooling oil flows through the gaps between the coils 8*a* from the first axial end to the second axial end. At the other end, cooling oil 19 that is supplied into the cooling oil channel 29 of the second externally mounted frame 10B' from the nozzle 21 flows downward through the cooling oil channel 29, is changed to axial flow at each of the oil flow direction changing projections 14, and the cooling oil 19 is sprayed into the gaps between the coils 8*a* from the second axial end. The cooling oil 19 flows through the gaps between the coils 8*a* from the second axial end to the first axial end.

Consequently, similar or identical effects to those of Embodiment 1 can also be achieved in Embodiment 2.

Here, because the cooling oil flows through the gaps between the coils 8*a* from the first axial end to the second axial end, the temperature of the cooling oil 19 increases gradually from the first axial end toward the second axial end. Similarly, because the cooling oil flows through the gaps between the coils 8*a* from the second axial end to the first axial end, the temperature of the cooling oil 19 increases gradually from the second axial end toward the first axial end.

According to Embodiment 2, oil flow direction changing projections 14 are formed on the inner circumferential wall surfaces of the first and second the externally mounted frame 10A' and 10B' so as to face the gaps between the circumferentially adjacent coils 8*a* so as to alternate between the first and second axial ends. Consequently, because the cooling oil that flows in adjacent gaps between the coils 8*a* flows in opposite directions, the temperature distribution in the axial direction of the coils 8*a* is made uniform, enabling the coils 8*a* to be cooled effectively.

Embodiment 3

Figure 6:
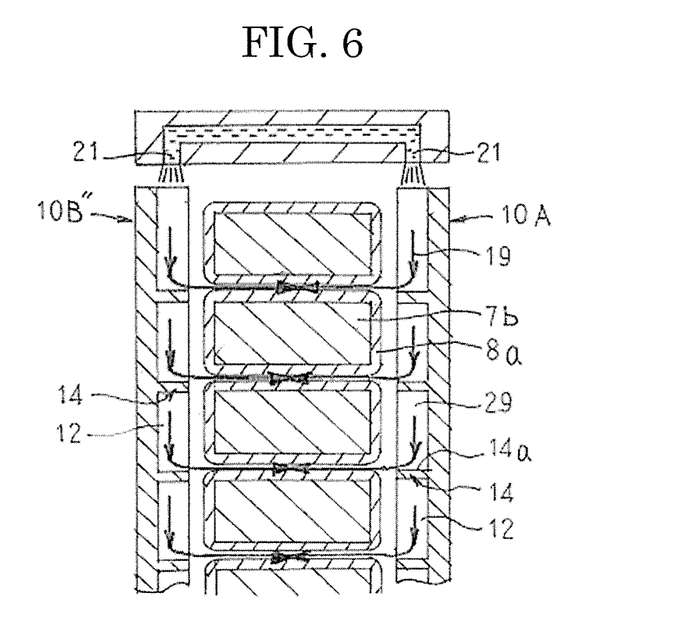
FIG. 6 is a schematic cross section that explains cooling oil flow in stator coils of a rotary electric machine according to Embodiment 3 of the present invention.

FIG. 6 is a schematic cross section that explains cooling oil flow in stator coils of a rotary electric machine according to Embodiment 3 of the present invention.

In FIG. 6, a radially outer peripheral wall portion (not shown) and an inner circumferential peripheral wall portion 12 are respectively formed concentrically on an inside wall surface of a second externally mounted frame 10B" so as to protrude in an axial direction in annular shapes, to constitute an annular cooling oil channel 29. A vertically upper portion position of the radially outer peripheral wall portion is cut away to constitute an oil inflow aperture. Twelve oil flow direction changing projections 14 are respectively formed on circumferences of a common circle on an inside wall surface of the second externally mounted frame 10B" so as to protrude in an axial direction such that cooling oil receiving surfaces 14a are oriented upward. The oil flow direction changing projections 14 are formed on the inner circumferential wall surfaces of the second externally mounted frame 10B" so as to face gaps between circumferentially adjacent coils 8a.

Moreover, Embodiment 3 is configured in a similar or identical manner to Embodiment 1 except that the second externally mounted frame 10B" is used instead of the second externally mounted frame 10B.

In Embodiment 3, cooling oil 19 that is supplied into the cooling oil channel 29 of the first externally mounted frame 10A from the nozzle 21 flows downward through the cooling oil channel 29, is changed to axial flow at each of the oil flow direction changing projections 14, and the cooling oil 19 is sprayed into the gaps between the coils 8a from the first axial end. The cooling oil 19 flows through the gaps between the coils 8a from the first axial end toward the second axial end. At the other end, cooling oil 19 that is supplied into the cooling oil channel 29 of the second externally mounted frame 10B" from the nozzle 21 flows downward through the cooling oil channel 29, is changed to axial flow at each of the oil flow direction changing projections 14, and the cooling oil 19 is sprayed into the gaps between the coils 8a from the second axial end. The cooling oil 19 flows through the gaps between the coils 8a from the second axial end toward the first axial end, and merges with the cooling oil that has flowed from the first axial end toward the second axial end at axially central portions of the gaps between the coils 8a.

Consequently, in Embodiment 3, the temperature distribution in the axial direction of the coils 8a is also made uniform, enabling the coils 8a to be cooled effectively.

Embodiment 4

Figure 7:
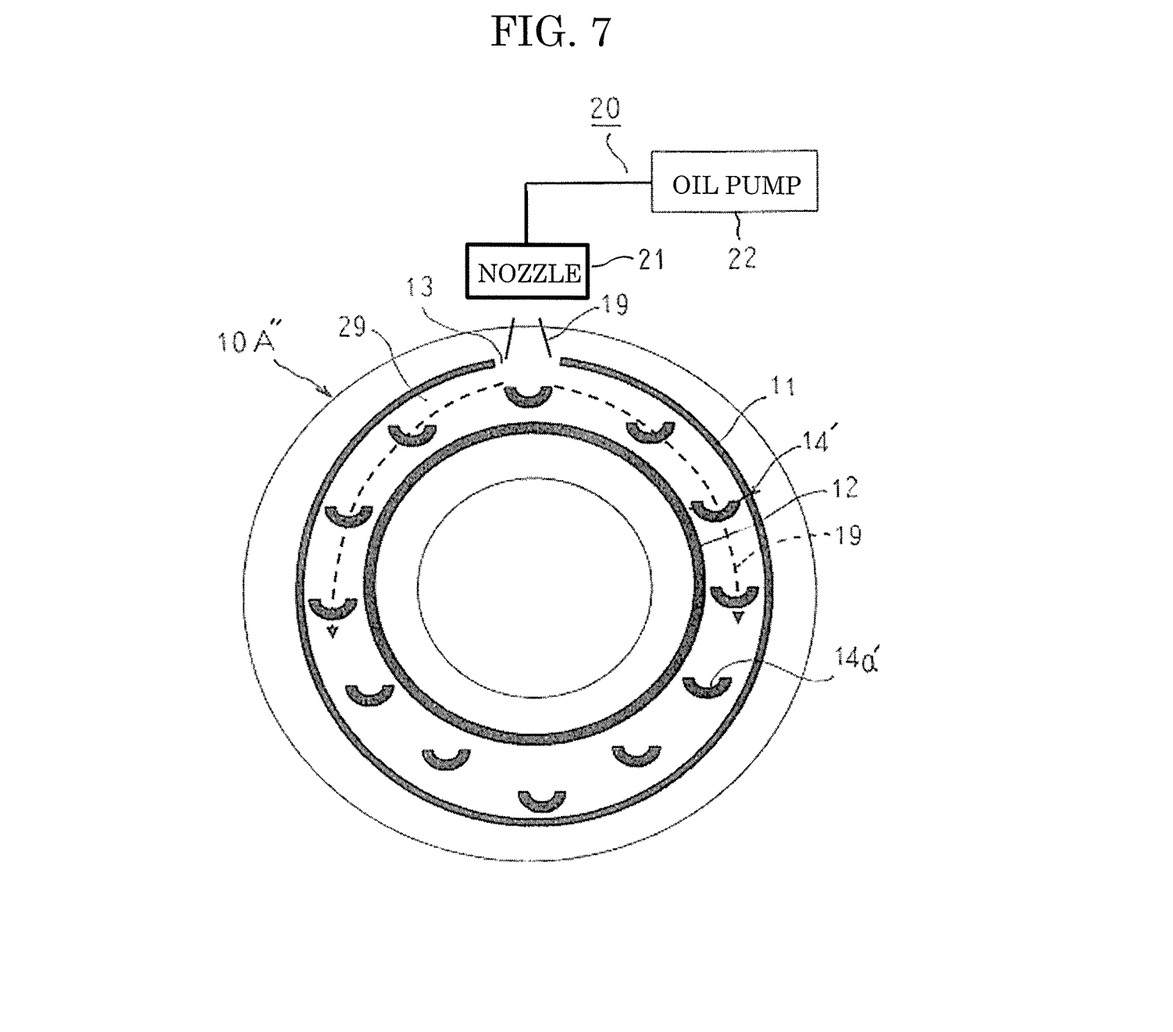
FIG. 7 is a front elevation that shows a first externally mounted frame in a rotary electric machine according to Embodiment 4 of the present invention.

FIG. 7 is a front elevation that shows a first externally mounted frame in a rotary electric machine according to Embodiment 4 of the present invention.

In FIG. 7, twelve oil flow direction changing projections 14' are respectively formed on a circumference of a common circle on an inside wall surface of the first externally mounted frame 10A" so as to protrude in an axial direction so as to have a circular arc shape that is convex vertically downward as a cross-sectional shape that is perpendicular to an axial direction. In other words, cooling oil receiving surfaces 14a' are formed so as to have concave surfaces that are convex downstream in the direction of flow of the cooling oil 19.

Moreover, Embodiment 4 is configured in a similar or identical manner to Embodiment 1 except that the first externally mounted frame 10A" is used instead of the first externally mounted frame 10A.

In Embodiment 4, the cooling oil receiving surfaces 14a' of the oil flow direction changing projections 14' are downwardly convex concave surfaces. Thus, because the amount of cooling oil 19 that flows through the cooling oil channel 29 that is captured by the oil flow direction changing projections 14' is increased, large amounts of cooling oil 19 can be supplied to the gaps between the coils 8a, enabling the coils 8a to be cooled effectively.

Embodiment 5

Figure 8:
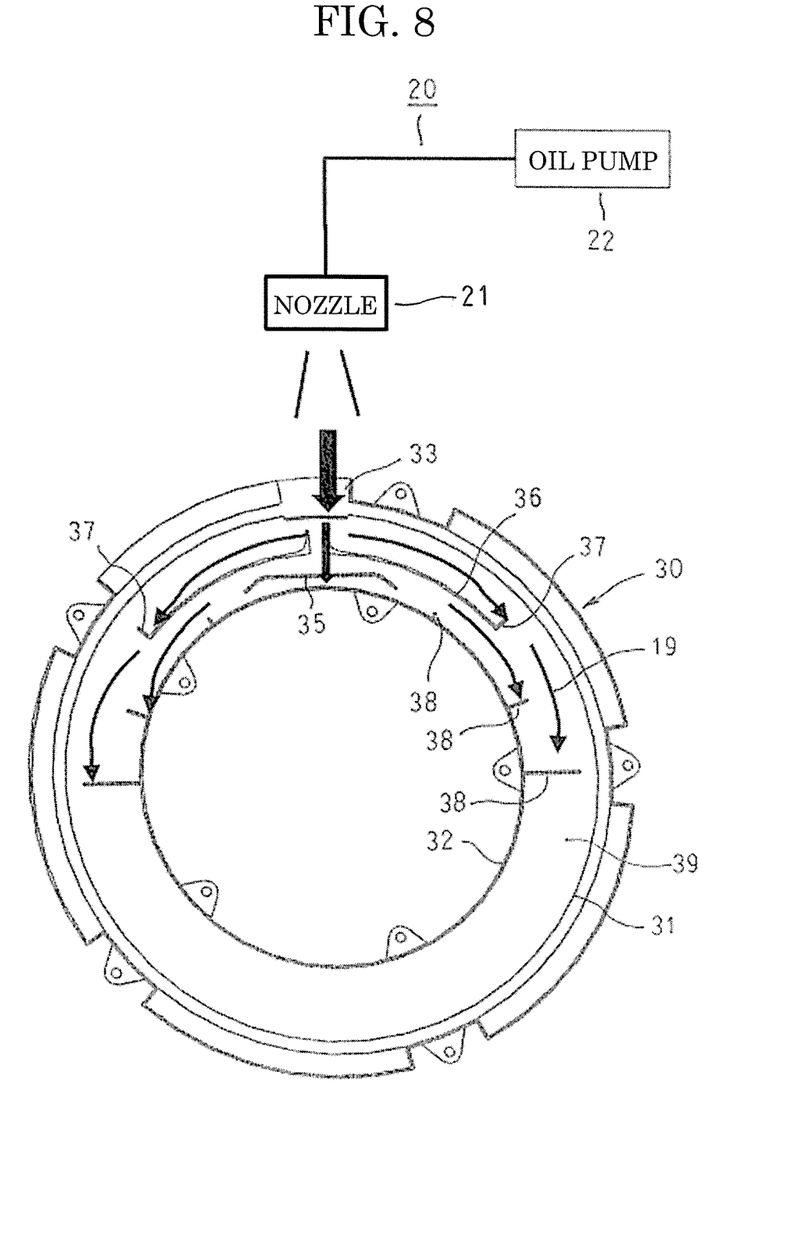
FIG. 8 is a cross section that shows a state in which a coil end cover is mounted in a rotary electric machine according to Embodiment 5 of the present invention.

FIG. 8 is a cross section that shows a coil end cover in a rotary electric machine according to Embodiment 5 of the present invention when viewed from an axially inner side. Moreover, FIG. 8 is a cross section in which the coil end cover is sectioned in a plane that is perpendicular to an axial direction and is viewed from a first axial end, and arrows in FIG. 8 represent cooling oil flow.

In FIG. 8, a coil end cover 30 is fixed to an axially inner surface of a first externally mounted frame by screws, for example, and is disposed so as to cover protruding portions (coil ends) of coils 8a that protrude outward at a first axial end of a stator core 6. The coil end cover 30 is produced so as to have an annular shape that has a U-shaped cross section in which first axial ends of a radially outer peripheral wall portion 31 and a radially inner peripheral wall portion 32 are linked by a floor portion (not shown) to constitute an annular cooling oil channel 39. A cooling oil receiving port 33 that is disposed on a vertically upper portion of the radially outer peripheral wall portion 31 is configured such that cooling oil 19 is supplied to the cooling oil channel 39. Moreover, a first externally mounted cover is produced so as to have a cup shape that covers a first axial end of a stator 5, and radially outer and radially inner peripheral wall portions that form cooling oil channels are not formed.

A first oil flow direction changing projection 35 is formed so as to protrude axially outward from a vertically upper portion of the bottom portion of the coil end cover 30 in a vicinity of the radially inner peripheral wall portion 32 such that an upper surface (a cooling oil receiving surface) is a flat surface that is perpendicular to the vertical direction. Second oil flow direction changing projections 36 are formed so as to protrude axially outward from the floor portion so as to be spaced apart radially outward and circumferentially from the first oil flow direction changing projection 35 so as to have circular arc shapes that are centered around a central axis of the coil end cover 30 as cross-sectional shapes that are perpendicular to an axial direction. Third oil flow direction changing projections 37 are formed so as to protrude radially outward from downstream end portions of the second oil flow direction changing projections 36 in a direction of flow of the cooling oil 19. In addition, a plurality of fourth oil flow direction changing projections 38 are respectively formed in a circumferential direction so as to protrude radially outward from the radially inner peripheral wall portion 32. Moreover, upstream surfaces of the third and fourth oil flow direction changing projections 37 and 38 in the direction of flow of the cooling oil 19 constitute cooling oil receiving surfaces.

Here, the first oil flow direction changing projection 35 changes the cooling oil 19 that flows in through the cooling oil receiving port 33 into an axial flow and circumferential flows. The second oil flow direction changing projections 36 change the cooling oil 19 that flows in through the cooling oil receiving port 33 into circumferential flows. The third and fourth oil flow direction changing projections 37 and 38 change the cooling oil 19 that flows through the cooling oil channel 39 in a circumferential direction into axial flows. The first, third, and fourth oil flow direction changing projections 35, 37, and 38 are disposed at first axial ends of gaps between each of the circumferentially adjacent coils 8a.

In Embodiment 5, the cooling oil 19 that is sprayed from the nozzle 21 is supplied into the cooling oil channel 39 of the coil end cover 30 through the cooling oil receiving port 33. The cooling oil 19 that has been supplied into the cooling oil channel 39 first contacts the cooling oil receiving surface of the first oil flow direction changing projection 35, a portion thereof is changed to an axial flow, and is supplied to a gap between the coils 8a, and a remaining portion flows circumferentially. The cooling oil 19 that has been supplied into the cooling oil channel 39 is also made to flow circumferentially by the second oil flow direction changing projections 36. The cooling oil 19 that has flowed circumferentially through the cooling oil channel 29 is changed to axial flows by contacting the cooling oil receiving surfaces of the third and fourth oil flow direction changing projections 37 and 38, and is supplied to the corresponding gaps between the coils 8a.

Consequently, similar or identical effects to those of Embodiment 1 can also be achieved in Embodiment 5.

Moreover, in Embodiment 5 above, the first, third, and fourth oil flow direction changing projections 35, 37 and 38 are disposed only in a region in the upper half of the cooling oil channel 39, but it has been confirmed that not only the region in the upper half of the coil group that is arranged in an annular shape, but also the region in the lower half of the coil group, can be cooled effectively thereby. Specifically, the regions in the lower half of the coil group are cooled effectively because portions of the cooling oil 19 that have been supplied to the coils by the first, third, and fourth oil flow direction changing projections 35, 37 and 38 pass downward over the surfaces of the coils, and are supplied to the region in the lower half of the coil group, and also because cooling oil 19 accumulates in lower portion spaces inside the first and second externally mounted frames.

Embodiment 6

Figure 9:
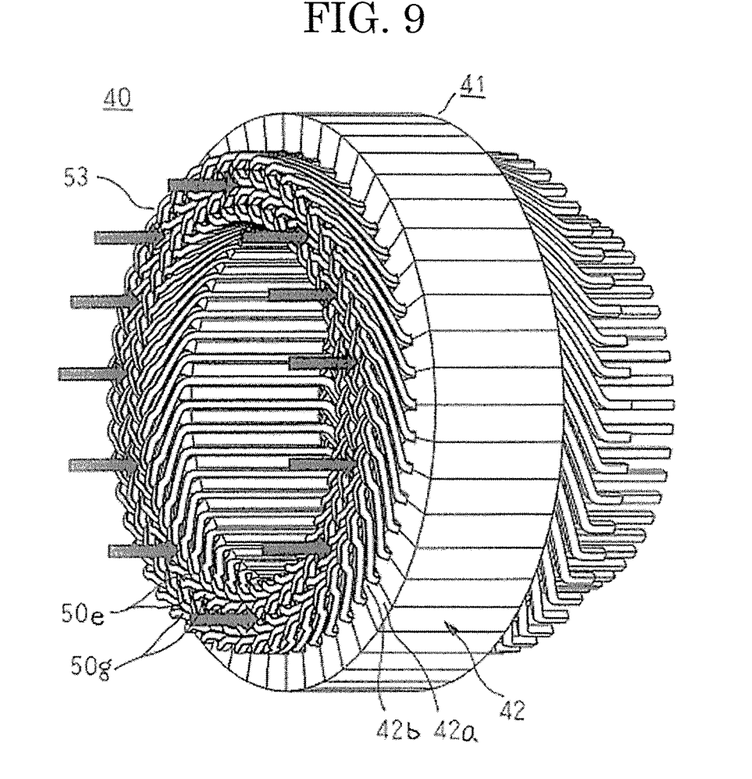
FIG. 9 is an oblique projection that shows a stator in a rotary electric machine according to Embodiment 6 of the present invention.
Figure 10:
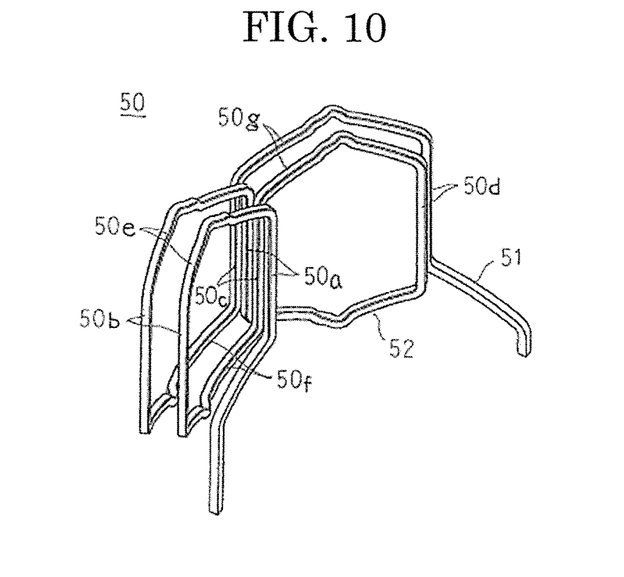
FIG. 10 is an oblique projection that shows a coil that constitutes part of a stator coil in the rotary electric machine according to Embodiment 6 of the present invention.
Figure 11:
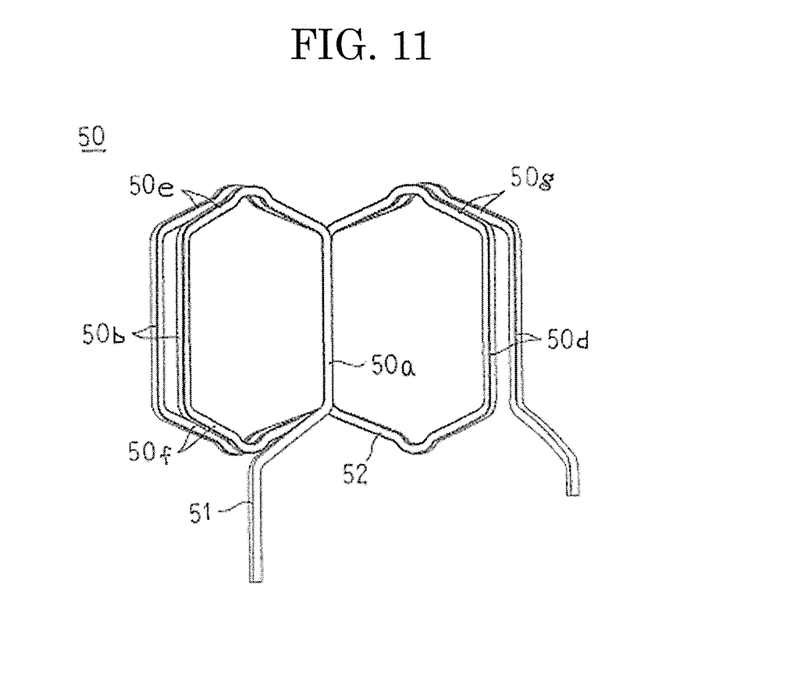
FIG. 11 is a front elevation that shows the coil that constitutes part of the stator coil in the rotary electric machine according to Embodiment 6 of the present invention.
Figure 12:
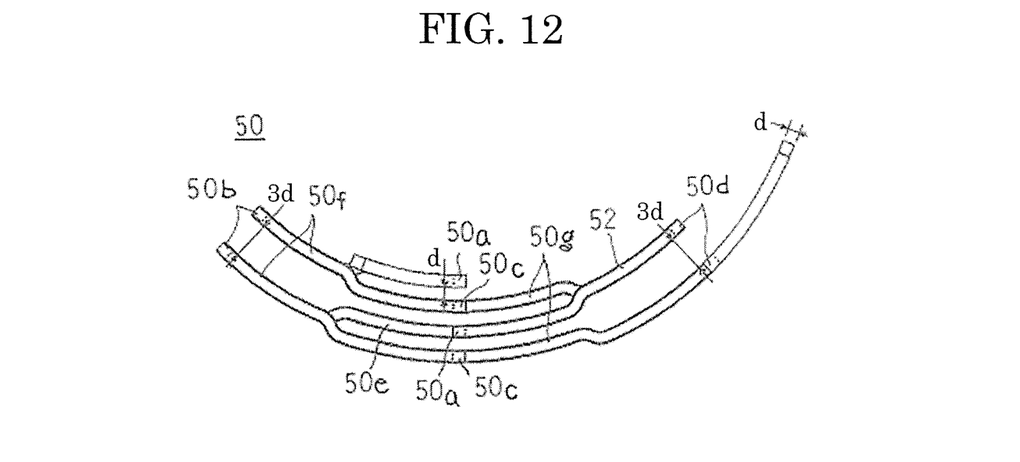
FIG. 12 is an end elevation that shows the coil that constitutes part of the stator coil in the rotary electric machine according to Embodiment 6 of the present invention.

FIG. 9 is an oblique projection that shows a stator in a rotary electric machine according to Embodiment 6 of the present invention, FIG. 10 is an oblique projection that shows a coil that constitutes part of a stator coil in the rotary electric machine according to Embodiment 6 of the present invention, FIG. 11 is a front elevation that shows the coil that constitutes part of the stator coil in the rotary electric machine according to Embodiment 6 of the present invention, and FIG. 12 is an end elevation that shows the coil that constitutes part of the stator coil in the rotary electric machine according to Embodiment 6 of the present invention.

In FIG. 9, a stator 40 includes: an annular stator core 41; and a stator coil 43 that is mounted to the stator core 41. Core segments 42 of the stator core 41 include: a circular arc-shaped back yoke portion 42a; and a tooth 42b that protrudes radially inward from a circumferentially central portion of an inner circumferential surface of the back yoke portion 42a. The stator core 41 is configured by arranging the core segments 42 into an annular shape such that circumferential side surfaces of the back yoke portions 42a are butted against each other. The stator coil 43 is configured by disposing coils 50 circumferentially around the stator core 41 at a pitch of one slot.

The coils 50 are distributed windings that are produced by winding conductor wires 51 into edgewise windings, the conductor wires 51 being made of jointless continuous rectangular copper wire that is insulated using an enamel resin, for example. Specifically, as shown in FIGS. 10 through 12, the coils 50 are configured such that two δ-shaped coil patterns that are constituted by a first rectilinear portion 50a, a first coil end portion 50e, a second rectilinear portion 50b, a second coil end portion 50f, a third rectilinear portion 50c, a third coil end portion 50g, and a fourth rectilinear portion 50d are arranged in a longitudinal direction of short sides of oblong cross sections of the conductor wires 51, and the fourth rectilinear portion 50d and the first rectilinear portion 50a are linked using a linking wire 52. The linking wires 52 constitute coil end portions, and winding start end portions and winding finish end portions of the conductor wires 51 constitute coil terminals 50i.

At a first axial end of a stator coil 53 that is configured by arranging these coils 50 at a pitch of one slot circumferentially, a layer of first coil end portions 50e in which the first coil end portions 50e are arranged circumferentially at a pitch of one slot and a layer of third coil end portions 50g in which the third coil end portions 50g are arranged circumferentially at a pitch of one slot are arranged alternately in four layers in a radial direction.

Moreover, Embodiment 6 is configured in a similar or identical manner to that of Embodiment 1 above except that the stator 40 is used instead of the stator 5.

In Embodiment 6, in a similar or identical manner to Embodiment 1, the cooling oil 19 that is sprayed from the nozzle 21 is supplied to the cooling oil channel 29 from the oil inflow aperture 13, and is changed into axial flow by contacting the cooling oil receiving surfaces 14a of the oil flow direction changing projections 14. As indicated by the arrows in FIG. 9, the cooling oil 19 that has been changed into an axial flow is discharged so as to be supplied between the first coil end portions 50e and the third coil end portions 50g of the circumferentially adjacent coils 50 from a first axial end, and flows from the first axial end of the coils 50 to a second axial end.

Consequently, similar or identical effects to those of Embodiment 1 can also be achieved in Embodiment 6.

In Embodiment 6, because distributed winding coils 50 are used, torque characteristics can be improved compared to the concentrated winding coils 8a in Embodiment 1, but the coil ends are increased in size, copper loss is greater, and the amount of heat generated is increased. However, by adopting the present cooling construction, because the cooling oil 19 flows between the coils 50, enabling temperature increases in the coils 50 to be suppressed, a rotary electric machine that has superior torque characteristics can be achieved.

Moreover, in Embodiment 6 above, distributed winding coils are used that are produced by winding a conductor wire into a δ-shaped coil pattern, but the distributed winding coils are not limited thereto, and may be hexagonal coils that are produced by winding a conductor wire into a helical shape, for example.

In each of the above embodiments, oil flow direction changing projections are produced into flat plate shapes or plate shapes that have circular arc-shaped cross sections, but the oil flow direction changing projections are not limited to these shapes, provided that the direction of the cooling oil flow can be changed axially, and may be produced into plate shapes that have V-shaped cross sections or wave-shaped cross sections, for example.

In each of the above embodiments, oil flow direction changing projections are disposed so as to face all of the gaps between the coils, but it is not absolutely necessary for the oil flow direction changing projections to be disposed so as to face all of the gaps between the coils, provided that they are distributed approximately uniformly in a circumferential direction, and they may be disposed so as to face every second gap between the coils in a circumferential direction, for example.

The invention claimed is:

1. A rotary electric machine comprising:
an externally mounted frame;
a rotor that is rotatably disposed inside said externally mounted frame such that an axial direction of a shaft is horizontal;
a stator comprising:
  a stator core that is annular and disposed coaxially so as to surround said rotor and that is held by said externally mounted frame, and
  a plurality of coils that are mounted to said stator core so as to be arranged in an annular shape;
a cooling oil channel that is annular and configured inside said externally mounted frame so as to face axially toward said plurality of coils that are arranged in the annular shape and such that a surface that faces said plurality of coils is made into an opening said cooling oil channel being axially separated from said stator and opening to an atmosphere;
an oil pump;
a nozzle that sprays cooling oil that is conveyed under pressure from said oil pump into said cooling oil channel from above; and
a plurality of oil flow direction changing projections that are discretely disposed inside said cooling oil channel,
wherein each of said plurality of oil flow direction changing projections is circumferentially arranged so as to face a gap between adjacent coils, respectively, among said plurality of coils, and has a cooling oil receiving surface,
said cooling oil receiving surface of each of said plurality of oil flow direction changing projections faces upstream with respect to a direction of a flow of said cooling oil so as to change said flow of said cooling oil that flows through said cooling oil channel to an axial flow so as to be supplied to said gap between said adjacent coils, respectively.

2. The rotary electric machine according to claim 1, wherein said cooling oil receiving surface of each of said plurality of oil flow direction changing projections is formed into a concave surface that is convex downstream in said direction of flow of said cooling oil.

3. The rotary electric machine according to claim 1, wherein said cooling oil channel is disposed only at a first axial end of said stator.

4. The rotary electric machine according to claim 1, wherein said cooling oil channel comprises a plurality of cooling oil channels disposed at two axial ends of said stator.

5. The rotary electric machine according to claim 4, wherein said plurality of oil flow direction changing projections are disposed in each of said plurality of cooling oil channels that are disposed at said two axial ends of said stator such that circumferential positions thereof are aligned so as to supply said cooling oil to identical gaps between said adjacent coils from said two axial ends.

6. The rotary electric machine according to claim 4, wherein said plurality of oil flow direction changing projections are disposed in each of said plurality of cooling oil channels that are disposed at said two axial ends of said stator such that circumferential positions thereof alternate so as to supply said cooling oil to alternate gaps between said adjacent coils.

7. The rotary electric machine according to claim 1, wherein said cooling oil channel is formed on an inner wall surface of said externally mounted frame.

8. The rotary electric machine according to claim 1, further comprising a coil end cover that is mounted to said externally mounted frame, and that is disposed so as to cover said plurality of coils that are arranged in the annular shape, said coil end cover constituting said cooling oil channel.

9. The rotary electric machine according to claim 1, wherein said plurality of coils are concentrated winding coils.

10. The rotary electric machine according to claim 1, wherein said plurality of coils are distributed winding coils.

* * * * *